April 24, 1956 H. B. FLEMING 2,743,434

SYSTEM OF CARRIER CURRENT DISTRIBUTION

Filed Dec. 27, 1952

INVENTOR
HUGH B. FLEMING.

Townsend, Townsend and Hoppe
ATTORNEYS

United States Patent Office 2,743,434

Patented Apr. 24, 1956

2,743,434

SYSTEM OF CARRIER CURRENT DISTRIBUTION

Hugh B. Fleming, Burlingame, Calif.

Application December 27, 1952, Serial No. 328,249

13 Claims. (Cl. 340—310)

This invention relates to new and useful improvements in distributing carrier signals over secondary circuits in conduit. It is common practice in large buildings, such as hotels, to install electrical conductors in conduit leading to the various rooms of the building. It is frequently desirable to provide convenient means for transmitting carrier signals to the various rooms, typical carrier signals originating from radio programs, intercommunication systems and the like. The present invention provides a means whereby the conduit and conductors normally installed therein may be employed to transmit the carrier signals to any desired location in the building.

The term "carrier current" is used herein to mean, in general, any application of oscillatory electrical currents to conductors whose primary use may be other than to carry such currents. The conductor used to carry the currents need not be a good conductor of electricity as insulated copper wire would be described, but may be iron pipe in intermittent contact with earth.

Heretofore various means have been employed and suggested using carrier current techniques. One example is the use of multi-channel telephone circuits whereby a plurality of messages may be transmitted through a plurality of channels over a single pair of conductors. In telephone practice, the currents (0 to 140,000 cycles per second) travel many hundreds of miles over the wires between terminals. The lines over which these signals pass must have very precise and consistent characteristics so as to eliminate interaction between adjacent channels and the presence of standing waves. (Standing waves, in effect, create a voltage distribution along a line that somewhat resembles a sine wave and passes through null points every one-half electrical wave length at the frequency under consideration.)

Thus telephone lines are driven at their "characteristic" or "iterative" impedance and terminated or loaded with the same value of impedance at the receiving end or at any intermediate branching point. The principal loss factor in such a system is the loss of open wire lines over the distance traveled.

Applications of carrier current to power lines have likewise been employed. In these applications, signal and telephone modulated carriers of 800 to 100,000 cycles per second, are applied to long distance high voltage power lines for the purpose of eliminating the expense of installing additional wires solely for communication and telemetering.

Attempts have also been made to transmit radio frequency currents over house and building wiring systems in order to avoid installing additional wiring.

All of the latter carrier current products possess a common purpose, namely that the customer might plug them in anywhere on lighting wiring to set up immediate communication between two points, but this purpose has not been satisfactorily accomplished.

While they sometimes worked satisfactorily, in general these systems have been erratic and in some cases inoperative. One reason for their unsatisfactory operation is that such devices necessarily feed reactive points on resonant, branching lines with constantly changing loads attributable to lights and appliances. As the loads are switched in and out, open and shorted stub lines change the character of the reactance, and consequently the standing wave pattern, in a random, unforeseeable manner. The null points in the standing wave pattern may be shifted so as to coincide with a desired receiving point, virtually eliminating any trace of signal. Another undesirable feature of standing waves on unloaded, reactive lines is unwanted and sometimes illegal radiation.

Another very basic disadvantage to the systems described is the fact that connected loads on the line are in parallel or shunt with the transmitted signal. These connected loads in addition to shifting the loss-producing standing wave pattern absorb and dissipate the carrier signal power in the basic manner of a series of resistors arranged in random ladder fashion along a transmission line.

The paralleling of signal and lighting loads causes the carrier devices to be especially susceptible to interference. Worst offenders in this regard are small motors with commutators or speed regulating contactors, fluorescent lights and thermostatic operated devices. For a time a device may be operating on or near a peak along the standing wave pattern of the line. Later, wave pattern may produce a null at the receiving point. The noise generating appliance near at hand will be in parallel with the signal in both cases, but will be almost insurmountable in the second case.

Only a short length of line can be driven by the usual method, because of the rapid attenuation due to the connected loads and the conditions resulting from mismatch. But since the noise-generating devices must be assumed to be uniformly distributed over the entire circuit, the devices being described must compete with a closely connected and unattenuated noise signal at almost any point.

Another fundamental limitation imposed upon prior art carrier devices is that they will not pass satisfactory signals through a distribution panel. They drive the A. C. conductors at an arbitrary outlet which may have both a high resistive and reactive component, but the receiving point a few doors away may come from a distribution panel with as many as forty branching connections. The signal path which results comprises a high impedance of the driving point in series with the extremely low impedance of forty parallel branching conductors. Since a mismatch is present, the inductance of the line between the driven point and panel is also in series with the signal. An attenuation of 65–70 db, can take place in a loop such as this. Where there have been applications of telephone type carrier transmitters to secondary power lines, the result has been only slightly better. The minimum driving impedance of these equipments is 150 to 300 ohms, whereas a distribution panel may be only 0.5 to 5 ohms.

The present invention, which is hereinafter described in greater detail, avoids the difficulties which have made prior devices inoperative or erratic. This is accomplished by converting a common conduit containing two or more conductors into a simulation of a coaxial cable, or, in effect, providing means whereby all of the conductors in the conduit function as if there were but a single conductor within the conduit.

Further, according to this invention, the carrier signal is not impressed upon the system at random, as in prior practice, but, on the contrary, the radio frequency carrier signal is matched in at the main distribution point in a given building—i. e. the main distributon panel—where the various branch conduits originate and where the impedance is very low (e. g. 0.5 to 5 ohms). There is little or no reactive component at the main distribution point by reason of the cancelling effects of the many paralleling branches. The effect produced is that of a system of coaxial cables branching out from the main distribution panel all over the building.

However, according to common practice as required by building codes throughout the United States, the neutral conductor of the three conductors in the conduit is grounded. This prevents building up a satisfactory signal. To overcome this fact, an inductance of a few microhenries is placed between the neutral conductor and its sole connection to ground. The conductor of the inductance coil is three or four turns of the same conductor size as used for ground lead in the given panel. Such a coil will have inconsequential impedance and resistance at common A. C. frequency (e. g. 60 cycles or similar commercial frequencies), but will have an impedance of 5 to 20 microhenries and resistance of about 10 ohms at the lowest frequencies which normally are used in the carrier line.

Another problem encountered and overcome by this invention is that of matching the impedance of 0.5 to 5 ohms which commonly exists at the main distribution point of the power distribution network with the high impedance of the radio frequency sources. In accordance with this invention a broad band transformer is employed, such as a ferrite transformer having special properties of high resistivity, low hysteresis and eddy current losses at frequencies up to about two megacycles and high core permeability. The efficiency of an impedance transformation of such a transformer from 2500 ohms to one ohm will be 80% or better.

Thus by driving the carrier signal at or near the central distribution point of the power distribution network, employing an impedance of the character described between the neutral conductor and ground, and utilizing a broad band transformer as hereinbefore discussed, a signal is successfully impressed on the secondary distribution system so that all the A. C. feeders are driven at a uniform potential relative to the conduit and the miscellaneous connected electrical and lighting devices are not loading the transmission line.

However, if the electrical length of any of the branch lines exceeds one-half the wavelength of the highest frequency used in the carrier signal, or where a panel box of many connections functions as a shorted stub across the line, then a problem of standing waves continues to exist. To overcome this problem, a signal from a broad band transformer is added to the signal emitted from the main power panel in suitable phase relationship at a booster point within fifteen or twenty feet of each point located at a distance from the main distribution panel more than one-half the wavelength of such signal. The signal is transmitted to the booster point by a coaxial cable such as types RG8U, RG59U, or the like, which are inexpensive to install since they carry no A. C. wiring currents or radio frequency power of appreciable magnitude. Losses through such a coaxial cable are negligible since its characteristic impedance is matched at both ends.

If the building being connected for carrier signals is quite large with long riser type runs, it may be necessary to connect into the riser at more than one point since its effective electrical length at the highest carrier frequency may exceed two half-wavelengths.

The practical method of determining the points in the wiring system at which the signal must be boosted is to make a survey of carrier signal voltage at all distribution boxes with only the main panel connected to the signal source as previously described. From this survey data, the standing wave pattern of a given building can be quickly plotted and the desired booster points determined.

There are two basic types of secondary systems in large buildings, the riser type and the branch type. In riser systems a heavy cable from the main panel passes consecutively through all floor distribution boxes in a vertical line. For this type of system only the half-wave points will develop nulls. The branching lines will usually be too short to represent an appreciable portion of an additional one-half wavelength.

The branch type system uses smaller cables and more of them to connect combination of floors, wings, etc. In this system sub-panels may require a booster connection more than once on a given floor but can be fed from one cable driving a signal "splitting" impedance matching transformer. Although it might appear branch circuits require more booster connections, such is not always the case for this method of distribution is used only in the smaller structures, seven floors or less in height.

The system which has heretofore been briefly described and is hereinafter described in greater specificity in one of its applications overcomes the disadvantages of prior systems of this general type. It has a principal advantage in applying a carrier signal to a complex, unbalanced network of branching conduit lines in such manner as if it were a balanced, non-resonant, "flat" line. By introducing the additive signals at the booster points, several distinct advantages result: First, a uniform signal strength is received throughout the wiring system. Second, the signal input requirements are greatly reduced due to elimination of the need of overdriving the wiring system to raise null area minimum voltages. Third, the system radiation is reduced by reason of the lower input power requirements.

A second group of advantages result from the method of feeding only at points of low reactive component, such as is the case at the main distribution panel and other sub-panels. First, a proper impedance match is made of signal source over a wide frequency band to the very low impedance of the paralleled cables by means of a broad band transformer; this impedance matching provides for a maximum transfer of useful carrier power. Second, it also aids in reducing the overall carrier power requirements because little energy is wasted on a reactive load. Third, it removes the possibility of exciting the system as a resonant radiating line or antenna such as would be the case if an unloaded point in a long line were to be driven with carrier voltage.

Another advantage is that the connection or feed at the main power panel between the whole group of wires in a conduit and the conduit itself reduces or eliminates coupling to the input side of a building service transformer. Both sides of the transformer secondary are at the same phase potential, thus cancelling the carrier component in the windings. Another feature of the described coupling method serves to reduce signal coupling to the high voltage primary. The point on the distribution panel driven by the carrier signal is a very low impedance point. The transformer windings, on the other hand, represent a relatively high impedance at carrier frequency. These two factors effectively limit the carrier signals from being transmitted on wires outside of a given building. A very important advantage obtained by the described carrier system is that connected appliance and lighting loads are no longer in shunt with the signal. The switching on of lights in a building at night does not appreciably affect the signal strength of carrier voltage throughout the building.

Still another advantage is that the system is less susceptible to noise voltages. Noise voltages are developed between conductors in the cable whereas all conductors in the cable are at the same potential to the conduit shell. The transmission of the signal so as to remove it from being shunted by lighting loads and paralleling generated noise voltages, greatly improves the signal to noise ratio.

A further advantage of the carrier system is the elimination of signal fluctuations due to shifting of the standing wave pattern as loads fluctuate. Since the connection of the carrier signal is not in shunt with the lighting loads, the changing reactance of the neutral to live conductors does not affect the standing wave pattern of the conduit to internal wire connection. Thus when the booster leads have raised the null points on initial installation, they remain boosted.

Another advantage of the system described is that more channels of carrier transmission can be used due to a raising of the maximum useful frequency. The elimination of resonant feeding requirements and the reduction of power possible due to stimulation of a "flat" line permits higher frequencies to be used for carrier transmission without exceeding radiation limits.

A further advantage of the system described is that carrier power requirements are reduced by insertion of the loading coil in the neutral conductor at the main panel and the half-wavelength booster connections. The insertion of the coil eliminates a low impedance short circuit from shunting the feed point on the main power panel. The booster cables, by maintaining a "flat" line of uniform carrier voltage, eliminate the need or tendency to overdrive to compensate for resonant null points.

Other objects and advantages of the invention will become apparent from the following description of the invention, reference being had therein to the accompanying drawings, in which.

Figures 1, 2:
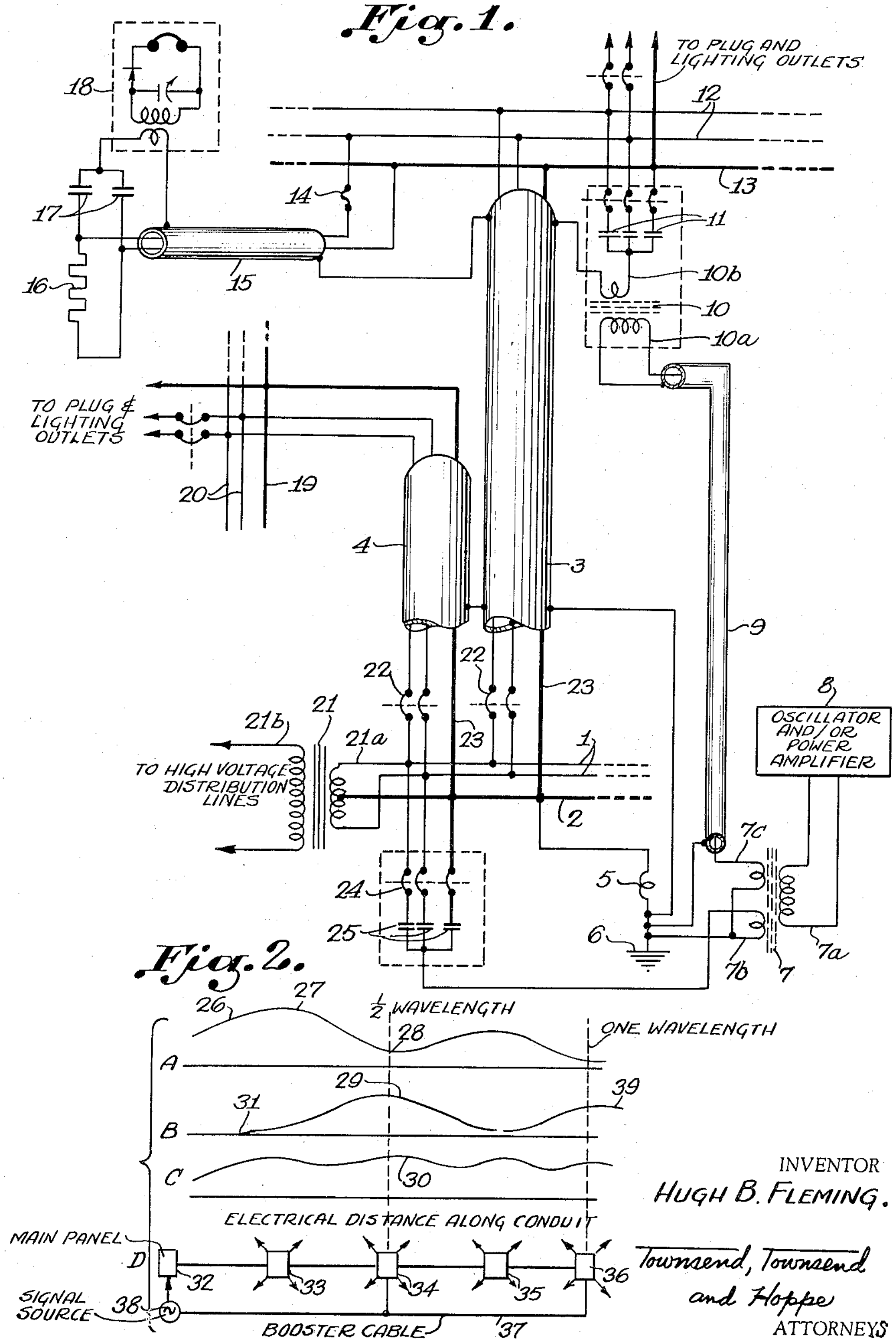
Fig. 1 is a schematic wiring diagram showing the invention installed in a typical power distribution system.
Fig. 2 is a chart showing diagrammatically the effect of employment of a booster cable in conduits of various electrical distances.

Referring to Fig. 1, conductors 1, 1, and 2 lead from the output of main building distribution transformer 21, said conductors being connected to the terminals of output coil 21*a*. Conductors 1, 1 are live conductors at a potential 120 volts above and below the neutral conductor 2. It is assumed that the system employs 60-cycle A. C. current. It may be assumed that conductors 1, 1 and 2 are the main buss bars at the main distribution point or main distribution panel from which all of the conduits such as 3 and 4 extend to various locations throughout the building or buildings served. Although, as will be understood, many conduits may be employed, only two, namely those indicated by reference numerals 3 and 4, are herein illustrated. Conduit 3 represents a long feeder or riser which is of a length about equal to that of one-half the wavelength of the frequency of the carrier power source, represented by oscillator 8. Riser 4 is a short lead considerably less than one-half this wavelength.

Riser 3 connects to a sub-panel represented by 12, 12 and 13, conductor 13 being the neutral conductor. Riser 4 connects to a sub-panel represented by 19, 20 and 20, with 19 being the neutral conductor. A short distribution line to a plug circuit from sub-panel 12 and 13 is represented by conduit 15. This single phase circuit is fused by 14, and a resistive lighting load is represented by resistor 16.

All of the conduit pipes are bonded conductively together at the main power panel; 3, 4 and 15 are all conductively bonded to a ground connection 6 in accordance with conventional safety code practice. At this principal ground point and only ground point, the neutral lead 2 is grounded through inductor 5 possessing an inductance of 5 to 20 millihenries.

A signal is generated by oscillator 8 which is coupled to broad band ferrite transformer 7, a low loss coupling device at radio frequencies. This transformer, hereinbefore described in detail, is a step-down device in turns ratio and transforms the energy of the oscillator at approximately 2500 ohms impedance to the approximately one ohm of impedance existing at radio frequency between 1, 1, 2 and the ground 6. This one ohm secondary 7*b* is connected to the main buss bars 1, 1 and 2 thru a matching box consisting of three isolating condensers, 25 and a protective circuit breaker 24. The condensers 25 are chosen so as to present a high impedance at 60 cycles per second, the power line frequency, and a low impedance at the carrier, frequency. The circuit breakers 22 shown in the riser 3 and 4 leads are also protective devices. The neutral lead 23 is never interrupted in the system by fuses or circuit breakers.

With the system connected as shown, the voltage distribution along riser 3 which is a half-wavelength long will be as shown in Fig. 2, part A, from 26 to 28. It should be noted that a null point exists at 28.

Tertiary 7C in the ferrite impedance matching transformer 7 drives coaxial cable 9 at its characteristic impedance. The energy is received by a second ferrite impedance matching transformer 10 which transforms the energy to match the 10 to 20 ohms of subpanel represented by 12, 12 and neutral 13. Here again the connection is between conduit pipe and all of the buss bars through three isolating condensers 11. The function of condensers 11 is identical with the function of condensers 25.

The voltage additive by cable 9 and associated matching transformers is shown by 29 on part B of Fig. 2. It will be noted that its carrying power is more limited than the carrying power from the main panel and is shown as diminishing to approximately zero a quarter wave on either side of the feed point. This is because here a relatively high impedance point is being driven and all other junction boxes appear as very low impedance shunts in series with the inductance of the line. It is also noted that the build-up at point 29 on B must be in proper phase relationship with 28 on part A or a minimum would be passed at some other point in the system. This phase relationship is accomplished by proper orientation of the windings on transformers 7 and 10.

On diagram B there is represented a second booster signal 39 as connected by cable 37 to junction box 36 on D. This is to show that additional booster connections are necessary every consecutive electrical half-wavelength regardless of the power and match at previous points of connection. The vector addition of the voltages of A and B over the system represented by D and junction boxes 33, 34, 35, 36 will be as shown in C. Although the resultant voltage distribution will possess peaks 30 and valleys of fluctuations, these will be very much less severe than those with A alone wherein dead nulls might be encountered under some conditions.

A receiving point is represented on the loaded end of circuit 15, with resistor 16, representing a resistive lighting load across conductor 12 to neutral 13. The signal pick-up is between both of these conductors through a pair of blocking condensers 17 and the conduit 15. Thus it can be seen that the load 16 is not in shunt with the signal transmission circuit. The receiver is represented by a conventional tuned crystal detector 18, but may be any type of detector-amplifier combination as commonly used for receiving radio frequency currents.

The system is applicable to any branching network of current carrying conductors in conduit, such as voice frequency currents, radio frequency currents or other alternating frequency currents and whether or not such prime networks are in use at time of employment of the present system of carrier current distribution.

Although the present invention has been described in some detail by way of illustration and example for purposes of clarity of understanding, it is understood that certain changes and modifications may be made within the spirit of the invention and scope of the appended claims.

I claim:

1. A system for distributing carrier current signals comprising at least one conductor, a conduit enclosing the said conductors, said conductors and conduit extending from a central distribution point of a branching network system, said conduit being grounded, an oscillator for carrier current signals, a receiver for carrier current signals, a blocking condenser for each said conductor connected to one of said conductors and to one side of the input of said receiver, the other side of the input of said receiver being grounded, a broad band radio frequency transformer to the input of which said oscillator is connected, one of the output terminals of said transformer being grounded, and an isolating condenser for each said conductor connected in parallel to the other output terminal of said transformer, each of said isolating condensers being connected to one of said conductors proximate said central distribution point, said conduit having a length greater than one-half the wavelength of the highest normal frequency of said carrier signal, which further comprises a second broad band transformer located at a booster point at a distance from said central distribution point approximately one-half said wavelength, a bridging cable connecting said first-named and second transformers, and a second set of isolating condensers for each said conductor connected in parallel to one of the output terminals of said second transformer, each of said second isolating condensers being connected to one of said conductors at said booster point, the other output terminal of said second transformer being grounded.

2. A system for distributing carrier current signals over branching secondary circuits in conduit comprising at least one conductive conduit, a central distribution point from which said conduit extends, at least three conductors in said conduit connected to a source of current, one of said conductors being a neutral conductor and two of said conductors being live conductors, means for grounding said conduit, an oscillator for carrier current signals, a receiver for carrier current signals, a pair of blocking condensers, one connected to one of said live conductors and the other to said neutral conductor, one input lead of said receiver being connected to both said blocking condensers and the other input lead of said receiver being grounded, a broad band transformer to the input of which said oscillator is connected, means for grounding one of the output terminals of said broad band transformer, and at least three isolating condensers connected in parallel to the other output terminal of said broad band transformer, each of said isolating condensers being connected to one of said conductors proximate said central distribution point, said isolating condensers having a high impedance at the frequency of said current and a low impedance at carrier frequency whereby at carrier frequency said conductors and said conduit comprise a coaxial cable.

3. A system for distributing carrier current signals over branching secondary circuits in conduit comprising at least one conductive conduit, a central distribution point from which said conduit extends, at least three conductors in said conduit connected to a source of current, one of said conductors being a neutral conductor and two of said conductors being live conductors, means for grounding said conduit, an oscillator for carrier current signals, a receiver for carrier current signals, a pair of blocking condensers, one connected to one of said live conductors and the other to said neutral conductor, one input lead of said receiver being connected to both said blocking condensers and the other input lead of said receiver being grounded, a broad band transformer to the input of which said oscillator is connected, means for grounding one of the output terminals of said broad band transformer, at least three isolating condensers connected in parallel to the other output terminal of said broad band transformer, each of said isolating condensers being connected to one of said conductors proximate said central distribution point, and an inductance having substantially zero impedance and resistance at the frequency of said current and substantial impedance at the lowest carrier frequency, said impedance being interposed in the sole connection between said neutral conductor and ground.

4. A system according to claim 3 in which said impedance is from 5 to 20 microhenries.

5. A system according to claim 2 in which said conduit has a length greater than one-half the wavelength of the highest normal frequency of said carrier signal which further comprises a second broad band transformer located at a booster point at a distance from said central distribution point approximately one-half said wavelength, a bridging cable connecting the first-named and second transformers, and a second set of three isolating condensers connected in parallel to one side of the output of said second transformer, the other side of the output of said second transformer being grounded, each of said second isolating condensers being connected to one of said conductors at said booster point.

6. A system according to claim 5 which further comprises an inductance having substantially zero impedance and resistance at the current frequency and substantial impedance at the lowest carrier frequency, said impedance being interposed in the sole connection between said neutral conductor and ground.

7. In combination, three branching current conductors, one of said conductors being neutral and the other two live, a conduit containing said three conductors, a carrier signal source, first means for impressing the carrier signal on said conduit and on all three said conductors as a unit, and a condenser connecting said conductors having a high impedance at the frequency of the transmission line current and a low impedance at carrier frequency whereby at carrier frequency said conductors and said conduit comprise a coaxial cable, said first means including a broad band matching transformer, said first means being connected to said coaxial cable at the point from which said conductors branch.

8. In combination, three branching current conductors, one of said conductors being neutral and the other two live, a conduit containing said three conductors, a carrier signal source, first means for impressing the carrier signal on said conduit and on all three said conductors as a unit, said first means including a broad band matching transformer, said first means being connected to said conductors at the point from which said conductors branch, and second means for imposing an inductance between said neutral conductor and its sole connection to ground to isolate the current and pass said carrier frequency.

9. The combination of claim 7 in which said conduit is longer than one-half the wavelength of the longest carrier signal frequency which further comprises a booster cable leading from said carrier signal source and third means connected to said booster cable for matching said carrier signal from said booster cable on said conduit and on all three said conductors as a unit at a point located from said first means approximately one-half the longest carrier signal wavelength.

10. The combination of claim 9 which further comprises means for imposing an inductance between said neutral conductor and its sole connection to ground to isolate the current and pass the carrier frequency.

11. Means for driving a carrier signal over a distribution network in conduit comprising first means for driving said signal, an impedance between any neutral conductor in said network and its sole connection to ground, and a broad band radio frequency transformer coupled between the source of signal and said network for matching the carrier impedance and the impedance of said network, said impedance at transmission line frequency having negligible impedance and resistance and at carrier current frequency having substantial impedance and resistance whereby at line frequency said neutral conductor is grounded and at carrier frequency has substantially the same potential relative to said conduit as the other conductors in said network.

12. Means for driving a carrier signal over a distribution network in conduit comprising first means for driving said signal, an impedance between any neutral conductor in said network and its sole connection to ground, a broad band radio frequency transformer coupled between the source of signal and said network for matching the carrier impedance and the impedance of said network, said network including a conduit of extended electrical length, and a second transformer vicinal a point along said conduit of extended length spaced from said first means a distance approximately one-half the wave length of the highest carrier frequency, said first and second transformers being adjusted in phase relationship to balance the phase relationship in said line to a flat, nonresonant characteristic.

13. Means for driving a carrier signal over a distribution network in conduit comprising first means for driving said signal, and a broad band radio frequency transformer coupled between the source of signal and said network for matching the carrier impedance and the impedance of said network, said carrier impedance being high at the frequency of the power current in said network and low at carrier frequency, said impedance and resistance of said network impedance being negligible at the frequency of the power current in said network and at carrier current frequency having substantial impedance and resistance.

References Cited in the file of this patent

UNITED STATES PATENTS

| | | |
|---|---|---|
| 2,032,360 | Green | Mar. 3, 1936 |
| 2,336,258 | Kenefake | Dec. 7, 1943 |
| 2,624,794 | Gooding | Jan. 6, 1953 |